(12) United States Patent
Welik et al.

(10) Patent No.: US 12,173,808 B2
(45) Date of Patent: Dec. 24, 2024

(54) ISOLATION GATE VALVE

(71) Applicant: Schenck Process Australia Pty Limited, North Ryde (AU)

(72) Inventors: Stanislaw Welik, Woodcroft (AU); Mariusz Milewicz, Turramurra (AU)

(73) Assignee: Schenck Process Australia Pty Limited, North Ryde (AU)

( * ) Notice: Subject to any disclaimer, the term of this patent is extended or adjusted under 35 U.S.C. 154(b) by 0 days.

(21) Appl. No.: 18/245,750

(22) PCT Filed: Sep. 20, 2021

(86) PCT No.: PCT/AU2021/051084
§ 371 (c)(1),
(2) Date: Mar. 17, 2023

(87) PCT Pub. No.: WO2022/056602
PCT Pub. Date: Mar. 24, 2022

(65) Prior Publication Data
US 2023/0358319 A1 Nov. 9, 2023

(30) Foreign Application Priority Data
Sep. 21, 2020 (AU) ................................ 2020903380

(51) Int. Cl.
*F16K 3/02* (2006.01)
*F16K 3/12* (2006.01)
*F16K 3/316* (2006.01)

(52) U.S. Cl.
CPC ............ *F16K 3/0281* (2013.01); *F16K 3/029* (2013.01); *F16K 3/12* (2013.01); *F16K 3/3165* (2013.01)

(58) Field of Classification Search
CPC .......... F16K 3/0281; F16K 3/029; F16K 3/12; F16K 3/3165

(Continued)

(56) References Cited

U.S. PATENT DOCUMENTS 4,235,256 A * 11/1980 Crawshay ............... F16K 3/312
277/645
6,663,079 B1 * 12/2003 Bottenfield ........... F16K 3/3165
251/328

(Continued)

FOREIGN PATENT DOCUMENTS

CN 206386501 U 8/2017
CN 207687388 U 8/2018

(Continued)

OTHER PUBLICATIONS

International search report for PCT/AU2021/051084 mailed on Nov. 9, 2021.

*Primary Examiner* — John Bastianelli
(74) *Attorney, Agent, or Firm* — Dennemeyer & Associates LLC

(57) ABSTRACT

The specification discloses an isolation gate valve (10) for controlling flow of a particulate type material of a dry or semi dry nature including ore and coal, the gate valve (10) having a support frame (11), at least one slidable blade member (20, 21) movably mounted relative to said support frame (11) to selectably open or close a material flow opening (12) defined by said support frame (11), one or more actuators (22, 23) provided to drive the slidable blade member or members (20, 21) between open or closed positions, the or each said slidable blade member (20, 21) having a forward leading edge region (27, 28) adapted, in use, to transversely extend across the material flow opening (12).

14 Claims, 10 Drawing Sheets

(58) Field of Classification Search
USPC .................................................. 251/326–329
See application file for complete search history.

(56) References Cited

U.S. PATENT DOCUMENTS

2018/0195623 A1* 7/2018 Geiser ..................... F16K 3/12
2018/0216739 A1* 8/2018 Ehrne ..................... F16K 51/02
2019/0293188 A1* 9/2019 Kennedy ................. F16K 3/30

FOREIGN PATENT DOCUMENTS

| EP | 0614828 A1 | 9/1994 |
|----|------------|--------|
| GB | 2522957 A | 8/2015 |
| WO | 2014179850 A1 | 11/2014 |

* cited by examiner

ISOLATION GATE VALVE

CROSS-REFERENCE TO RELATED APPLICATIONS

This is a 35 U.S.C. 371 National Stage Patent Application of International Application No. PCT/AU2021/051084, filed Sep. 20, 2021, which claims priority to Australian application 2020903380, filed Sep. 21, 2020, each of which is hereby incorporated by reference in its entirety.

FIELD OF THE INVENTION

The field of the invention is improvements in isolation gates or valves, sometimes referred to as guillotine valves, commonly but not exclusively, used for the control of movement of dry or semidry particulate materials such as iron ore, other mined ore materials, mined coal, and like materials.

BACKGROUND

Gate valves of the aforementioned type generally include a support frame defining a flow opening or orifice for the flow of material therethrough when the gate valve is open. The opening or orifice might be square, rectangular, circular or any other desired shape. The flow opening or orifice may be closed (or partially closed) by movement of at least one blade member transversely across the opening or orifice relative to the support frame to restrict or fully close the opening or orifice. The movement of the blade member or members may be achieved by operation of one or more actuators for the or each blade member. In gate valves of this type having two blade members, at least one of which is movable relative to the other, it is known to arrange the blade members in a common plane where, in a closed configuration, adjacent edges of the blade members abut one another. In a possible further configuration, the blade members might be arranged in adjacent planes whereby adjacent edge regions of the blade members slide over one another partially engaging surfaces of the other blade member. The free edges of the blade members are usually straight. It is also known to support the movable blade member (or members) on bearing members typically providing rolling support for the blade member(s) as the particular blade member moves towards either a closed or open position. The bearing members typically also provide bearing support for the blade member (or members) against loading forces of the material attempting to flow through the flow opening or orifice when in the closed position with the blade member or members being stationary. Adjustment of the rolling surface of such bearing members is generally desirable as is the replacement of such bearing members for servicing requirements. The movement of the or each blade member through material that is flowing through the flow opening or orifice is relatively easy but when the material is stationary, it becomes increasingly more difficult for a blade member of the above discussed type to move through the material. This difficulty is increased by increasing moisture levels in the material controlled by the isolation gate valve. Such circumstances may cause increased difficulty to move the isolation gate valve to its closed position.

In general isolation gate valves of the aforementioned type are usually relatively large mechanical constructions as large quantities of the material being processed pass through the isolation gate valve during its use. Regardless, however, it is also desirable for the isolation gate valve to occupy as small a space as possible both in its dimensions laterally extending from the flow opening or orifice and in its dimensions in the flow direction through the flow opening or orifice.

SUMMARY OF THE INVENTION

An objective of the present disclosure is to provide an improved isolation gate valve of the aforementioned kind. Still further an improved bearing roller construction is proposed enabling an effective compact structure while maintaining ease of maintenance, adjustability and long term reliability. Preferably the present invention also aims at providing a more effective moving blade member to assist its movement towards a closed position.

In one aspect, the disclosure set out in this specification provides an isolation gate valve having a support frame structure defining a material flow opening, at least one blade member movably mounted relative to the material flow opening in said support frame structure, the or each said at least one movably mounted blade member being supported on a lower face thereof by multiple spaced apart rolling elements, at least one of said rolling elements being formed as part of a roller cartridge assembly having an outer mounting plate structure releasably connected to said support frame structure and a roller sleeve rotatably mounted to said outer mounting plate structure, the roller cartridge assembly extending inwardly through an aperture in a wall region of the support frame structure, the aperture being sized sufficiently to allow the roller cartridge assembly including the roller sleeve to be bodily removed from the support frame structure.

Conveniently, the roller cartridge assembly includes the outer mounting plate structure, a mounting shaft securable to the outer mounting plate structure and the roller sleeve rotatably supported on the mounting shaft. The roller cartridge assembly allows the or multiple roller bearing ring(s) provided by the roller sleeve(s) to be replaced, when needed, from an external position relative to the isolation gate valve.

Preferably, in a first position of one of said at least one movably mounted blade member, said material flow opening is configured to allow material flow therethrough, and in a second position of said one of said at least one movably mounted blade member said material flow opening is configured to prevent or inhibit material flow therethrough, said one of said at least one movably mounted blade member having a leading edge region adapted, in use, to transversely extend across said material flow opening, said one of said at least one movably mounted blade member further having opposed upper and lower faces extending rearwardly from said leading edge region and opposed first and second side edge zones extending rearwardly from said leading edge region.

Conveniently, all of the aforesaid rolling elements may be constructed as a said roller cartridge assembly.

In a still further possible aspect, the present disclosure provides an isolation gate valve having a support frame structure defining a material flow opening, at least one blade member movably mounted relative to the material flow opening in said support frame structure whereby in a first position of said movably mounted blade member said material flow opening is configured to allow material flow therethrough, and in a second position of said movably mounted blade member said material flow opening is configured to prevent material flow therethrough, actuator positioned to operationally move said movably mounted blade member between said second position and said first position, said movably mounted blade member having a leading edge region adapted, in use, to transversely extend across said material flow opening, said leading edge region of said movably mounted blade member having a plurality of extended zones separated by recessed zones to form separated teeth formations, said leading edge region being adapted to mesh with a complementary configured region of a second member when said movably mounted blade member is in said second position. Preferably, in the second position contact occurs between the leading edge region of the movably mounted blade member and the second member whereby the second position may be referred to as a second contact position.

In any of the aspects described in this disclosure, the rolling element of the or each roller cartridge assembly(s), may have a roller surface positioned, in use, in rolling contact with the lower face of the corresponding said at least one movably mounted blade member, said rolling element being carried on an eccentric shaft portion of a mounting shaft portion of a mounting shaft positional selectively relative to the roller cartridge assembly whereby said roller surface position relative to the lower face of the corresponding said at least one movably mounted blade member is selectively adjustable by selective rotation of said mounting shaft.

Movement of the movably mounted blade member may be understood by reference to an orthogonal system where a "y" axis thereof represents a direction of movement of the movably mounted blade member and an "x" axis thereof represents a direction of the leading edge of the movable blade member relative to its direction of movement. It will, however, be apparent to those skilled in this art that the leading edge of the movably mounted blade member need not be at 90° to the direction of movement of the blade member but could be at an acute angle thereto. Other configurations are also possible provided that there is complementary engagement or meshing between the leading edge of the movably mounted blade member and the second member. The foregoing of course equally applies to following described aspects of this disclosure.

Conveniently, the actuator may comprise at least one linear actuator for each slide blade member that is movably mounted in the isolation gate valve. Preferably, a linear actuator is operationally connected to each said movably mounted slide blade member on either side edge zone thereof in the isolation gate valve.

Conveniently, the teeth formations are positioned at least in a portion of the leading edge region of the movably mounted blade member. The aforesaid portion of the leading edge region may be a centrally located portion or alternatively and more preferably the teeth formations may be positioned along a complete length of the leading edge region.

Preferably, each of the extended formations tapers towards an outer end thereof. More preferably at least one, or both, upper and lower surfaces of each said extended formation tapers towards the outer end thereof. Still further, each of the extended formations may have side surfaces connecting the upper and the lower surfaces, the side surfaces tapering towards each other in a direction towards the outer end of the extended formation. In this possible configuration, each extended formation presents a pyramidal type shape.

Conveniently, the leading edge regions of the movably mounted blade member and said complementary configured region of said second member provide an abutting seal line when said movably mounted blade member is in said second closed position.

In one possible embodiment, the second member may be a second blade member or a second structural part, that is stationarily mounted to or forms part of the support frame structure. Alternatively, the second member might be a second said blade member movably mounted relative to the material flow opening in the support frame structure.

In one possible arrangement, the extending edge formations on the leading edge region of the movably mounted blade member might be integrally formed with a first body section of the movably mounted blade member. More preferably, however, the leading edge region of the movably mounted blade member is formed as a separable or replaceable edge strip connectable to or removable from the first body section of the movably mounted blade member. This allows the leading edge region to be replaced should wear damage occur without requiring replacement of the whole movably mounted blade member.

In arrangements utilizing extending teeth formations with two relatively movable blade members, the blade members would generally be moved in a common or single plane. However, certain features, aspects and combinations of features are disclosed herein that might usefully be employed without necessarily including the also disclosed extending teeth formations. In these arrangements, when two movably mounted blade members are used, they can operate in either the same or a common plane, or alternatively in adjacent but separate planes.

In a further aspect of this disclosure, an isolation gate valve is provided having a support frame structure defining a material flow opening, and at least one blade member movably mounted relative to the material flow opening in said support frame structure whereby in a first position of said movably mounted blade member said material flow opening is configured to allow material flow therethrough, and in a second position of said movably mounted blade member said material flow opening is configured to prevent or inhibit material flow therethrough, an actuator positioned to operationally move said movably mounted blade member between said second position and said first position, said movably mounted blade member having a leading edge region adapted, in use, to transversely extend across said material flow opening, said movably mounted blade member further having opposed upper and lower faces extending rearwardly from said leading edge region and opposed first and second side edge zones extending rearwardly from said leading edge regions, at least one rolling element mounted to said movably mounted blade member adjacent to one or both said first or said second side edge zones of said movably mounted blade member, at least one said rolling element extending laterally beyond a most adjacent said first or said second side edge zone of said movably mounted blade member.

In a preferred aspect, the aforedescribed isolation gate valve may have either one movably mounted blade member cooperable with a stationary second member in said second position, or may have two said movably mounted blade members whereby the leading edge zones of said movably mounted blade members cooperate in said second position. Conveniently, the or each said movably mounted blade member includes a blade body section and a pair of blade side bars extending rearwardly from a trailing edge region of said blade body section, said blade side bars extending said first and said second side edge zones rearwardly from said trailing edge region of the blade body section, a said rolling element being mounted to one or both said blade side bar(s).

Preferably, in the aforesaid further aspect, a said rolling element is mounted in both of the first or said second side edge zones. Conveniently, multiple spaced roller elements are provided in one or both of said first and said second side edge zones. Preferably the or each said rolling element is contained between planes defined by said opposed upper and lower faces of the movably mounted blade member. Advantageously, the or any one of the aforesaid rolling elements has a roller surface that is adjustable in lateral distance extending outwardly from the first or the second side edge zone of the movably mounted blade member.

Preferably, the actuator includes a first actuator member and a second actuator member, said first actuator member being operationally connected to said support frame structure on one side of said material flow opening and to the first side edge zone of said movably mounted blade member, said second actuator member being operationally connected to said support frame structure on a second side of said material flow opening opposite to said one side thereof and to the second side edge zone of said movably mounted blade member. Conveniently, each of said first actuator member and said second actuator member is operationally connected to said movably mounted blade member rearwardly distant from said leading edge region. Preferably, each of said first actuator member and said second actuator member includes an angle alignment coupler.

In a yet still further aspect, the present disclosure provides an isolation gate valve having a support frame structure defining a material flow opening, and at least one blade member movably mounted relative to the material flow opening in said support frame structure whereby in a first position of said movably mounted blade member said material flow opening is configured to allow material flow therethrough, and in a second position of said movably mounted blade member said material flow opening is configured to prevent or inhibit material flow therethrough, an actuator positioned to operationally move said movably mounted blade member between said second position and said first position, said movably mounted blade member having a leading edge region adapted, in use, to transversely extend across said material flow opening, said movably mounted blade member further having opposed upper and lower faces extending rearwardly from said leading edge region and opposed first and second side edge zones extending rearwardly from said leading edge region, said actuator including a first actuator member and a second actuator member, said first actuator member being operationally connected to said support frame structure on one side of said material flow opening and to the first side edge zone of said movably mounted blade member, said second actuator member being operationally connected to said support frame structure on a second side of said material flow opening opposite to said one side thereof and to the second side edge zone of said movably mounted blade member, each of said first actuator member and said second actuator member including an angle alignment coupler.

According to a still further preferred aspect, the disclosure of this specification might also include a slide blade member for use in an isolation gate valve where the slide blade member has a pair of opposed lateral side edge zones with at least one rolling element having a roller surface extending partially laterally from a said side edge zone of the slide blade member, said rolling element being mounted on an eccentric shaft portion of a mounting shaft carried by the slide blade member, whereby selective rotation of the mounting shaft results in adjustment of an extent of lateral extension of the roller surface relative to said side edge zone of the slide blade member.

According to a yet further aspect, the disclosure of this specification may also include the provision of a slide blade member for use in an isolation gate valve having a support frame structure defining a material flow opening, the slide blade member, in use, being adapted to at least partially close or open said material flow opening, said slide blade member including at least one cartridge assembly with at least one rolling element having a rolling surface extending partially laterally from a side edge zone of said slide blade member, the or each said rolling element being mounted on a mounting shaft carried by a said cartridge assembly, the cartridge assembly is bodily connectable to or removable from upper or lower faces of said slide blade member or said side edge zone of said slide blade member.

The slide blade member as aforesaid may include extension bar members extending one or both said side edge zones. Preferably the or each said cartridge assembly may include a cartridge mounting structure member releasably securable to a side edge zone, the cartridge mounting structure carrying said mounting shaft and said rolling element as a single unit capable of being removed as a whole and replaced as a whole when required.

Preferably, the or each said rolling element is mounted on an eccentric portion of said mounting shaft, whereby selective rotation of the mounting shaft results in adjustment of an extent of lateral extension of the rolling surface relative to a side edge zone of the side blade member.

The roller surface of the rolling element when arranged generally between the upper and lower faces, may preferably not extend upwardly beyond the upper face of the slide blade member or downwardly beyond the lower face of the slide blade member. Conveniently, the mounting shaft may selectably be positionable in one of a plurality of rotation positions. Preferably at least one said rolling element is positioned on each said side edge zone of the slide blade member. More preferably, at least two or more said rolling elements may be spaced along at least one, and preferably both, of said side edge zones.

The present specification also anticipates providing an isolation gate valve including one or more slide blade members as described in the preceding two paragraphs.

In yet another preferred aspect, the disclosure may also provide a rolling element for use with a slide blade member adapted, at least in part, to open or close a material flow opening of an isolation gate valve, said rolling element including an outwardly facing peripheral roller surface, said rolling element further being carried on an eccentric portion of a selectably rotationally positionable shaft member, and positioning means for operationally fixing said rotationally positionable shaft member in one of a plurality of different positions to selectably locate lateral positioning of said roller surface.

Preferably, the rolling element has a first inner ring part carried on said eccentric portion of the rotationally positionable shaft member and a second outer ring part carrying said roller surface being rotationally configured relative to said first inner ring part. Preferably, bearing elements may be arranged between said second outer ring part and said first inner ring part, said second outer ring part being capable of at least limited angular swivel motion relative to said first inner ring part.

Again the present specification anticipates a disclosure of an isolation gate valve including one or more rolling element(s) as described in the preceding two paragraphs.

It will be understood that the terms "comprises", "comprising", "includes", and/or "including" when used herein, specify the presence of stated features, items, steps, operations, elements, and or components, but do not preclude the presence or addition of one or more other features, items, steps, operations, elements, components, and/or groups thereof. Furthermore certain features or aspects have been described, particularly in relation to specific embodiments illustrated in the drawings, however, it is anticipated that the features or aspects can be valuably used in other known isolation gate valve designs and the present specification anticipates that this is the case and will be recognized to be so by those skilled in this art.

Various objects, features, aspects and advantages of the subject matter of this disclosure will become more apparent from the following detailed description of the preferred embodiments also illustrated in accompanying drawings.

DETAILED DESCRIPTION

Figure 1:
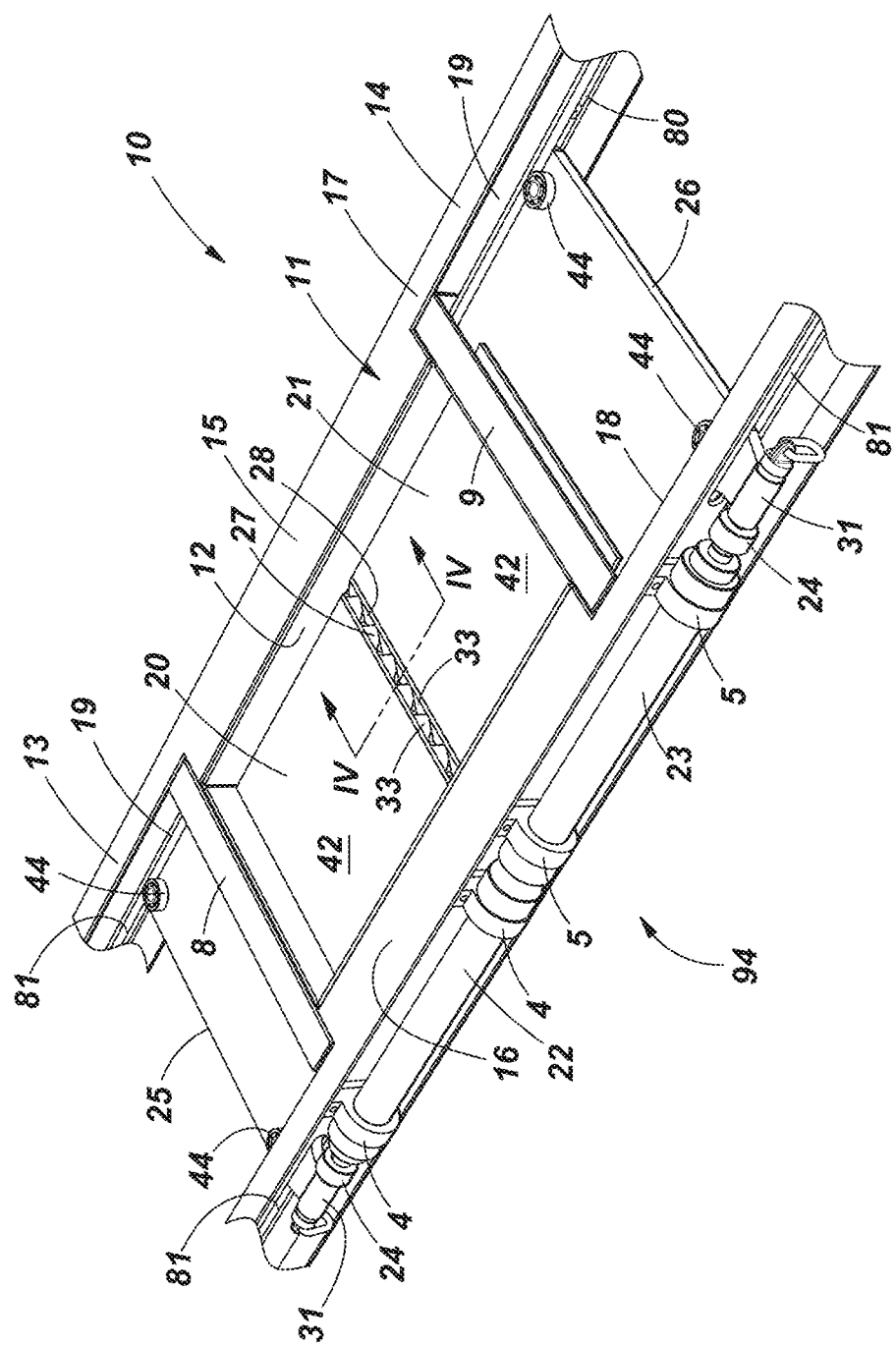
FIG. 1 is a perspective view of one preferred embodiment of an isolation gate valve with two cooperating movable slide blade members in a closed configuration.

Referring initially to FIG. 1 of the accompanying drawings, one possible preferred embodiment of an isolation gate valve 10 is shown in a closed configuration. The isolation gate valve 10 includes a support frame structure 11 defining centrally a material flow opening 12 for material to be controlled by the gate valve 10 in use of same, to pass therethrough when the gate valve 10 is open, or at least partially open. The support frame structure 11 includes a first end section 13 and a second end section 14 on opposite sides of a central section 15 defining the flow opening 12. The central section 15 containing the flow opening 12 and being defined by central portions of opposed side frame members 16, 17 and spaced cross frame members 8, 9. The frame side members 16 and 17 extend along the first, second and central sections 13, 14 and 15 defining inwardly facing roller guide tracks 18, 19 for slide blade members 20, 21. A first actuator member 22 is operationally secured centrally to the frame side member 16 via connection means 4 with a second actuator member 23 being also secured operationally to the frame side member 16 via connection means 5 adjacent to the first actuator member 22. Similarly positioned first and second actuator members 22, 23 are operationally secured to the frame side member 17. An angle alignment coupler device 24 is connected between each of the first and the second actuator members 22, 23 and an outward positioned edge zone 25, 26 of the slide blade members 20, 21. The first and the second actuator members 22, 23 can be considered to comprise an actuator 94.

In the preferred embodiment illustrated in FIG. 1, the slide blade members 20, 21 are supported to move in a common plane whereby in the closed configuration (FIG. 1), confronting leading edge regions 27, 28 of the slide blade members 20, 21 engage one another to provide a seal line across the flow opening 12 such that the slide blade members 20, 21 together close the flow opening 12. While this is one preferred arrangement, other configurations are also possible. For example, an isolation gate valve is possible utilizing only one moving slide blade member having its leading edge region 27 or 28 operatively engaging with a stationary plate member or other member in the closed configuration. Another possibility could be to have two slide blade members positioned with their confronting leading edge regions 27, 28 overlapping in the closed configuration. In such an arrangement only one or both the blade members might be mounted for movement.

Figure 2A:
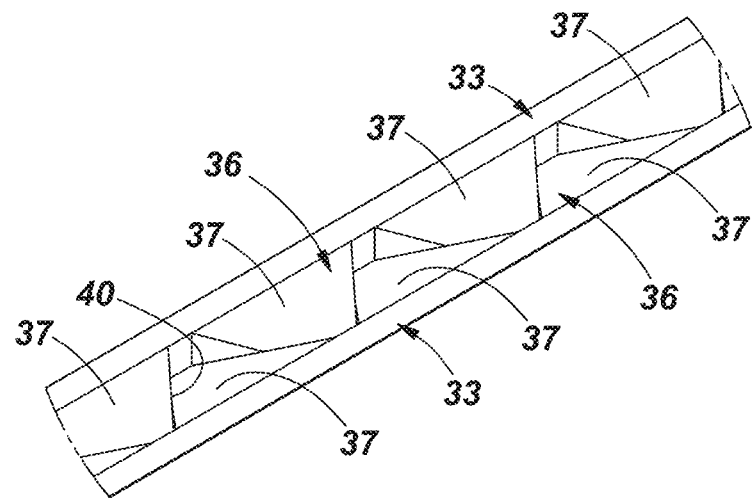
FIGS. 2a and 2b are detailed perspective views of the complementary cooperating leading edge zones of the two movable slide blade members shown in FIG. 1 respectively viewed from above and below.
Figure 2B:
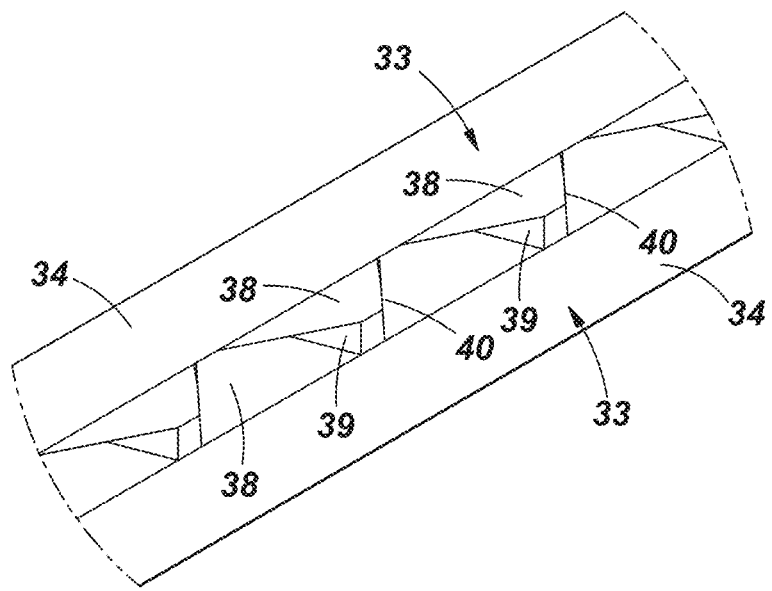
Figure 3:
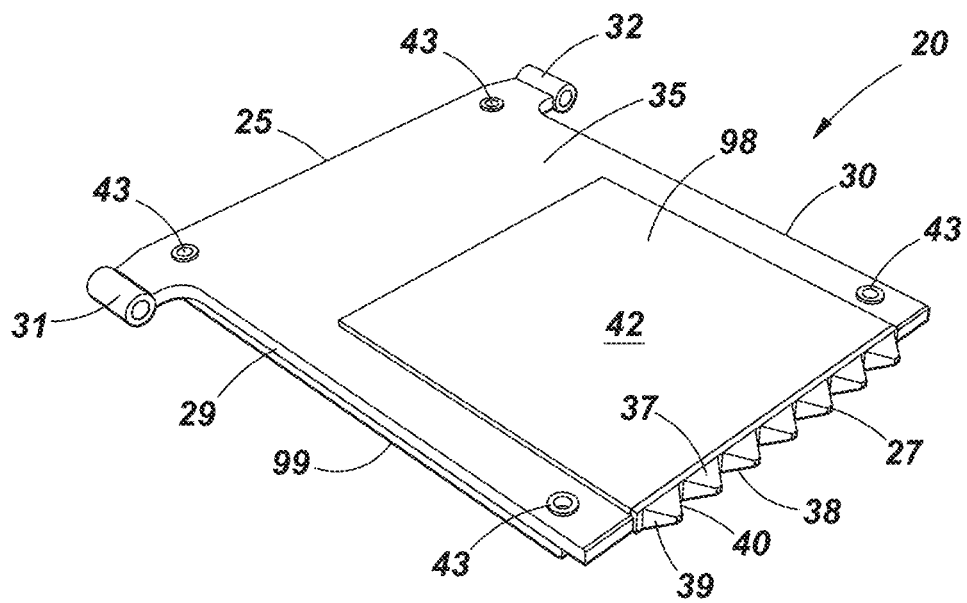
FIG. 3 is a perspective view of one preferred movable slide blade member as shown in FIG. 1.
Figure 4:
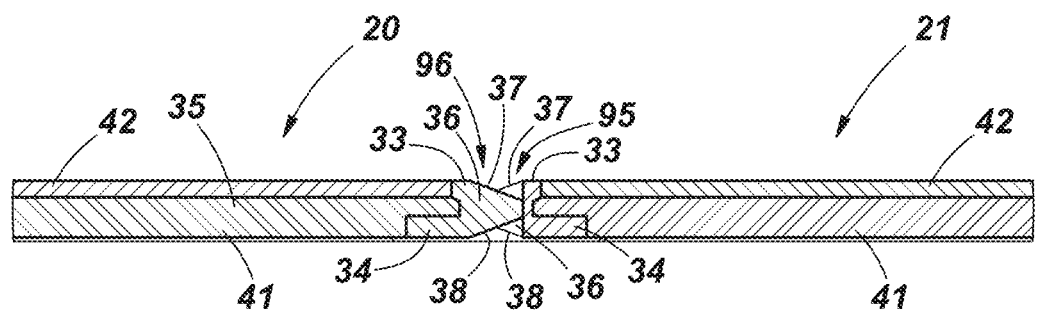
FIG. 4 is a cross-section view along line VI-VI of FIG. 1 showing cooperating edge strips of the two movable slide blade members.
Figure 5:
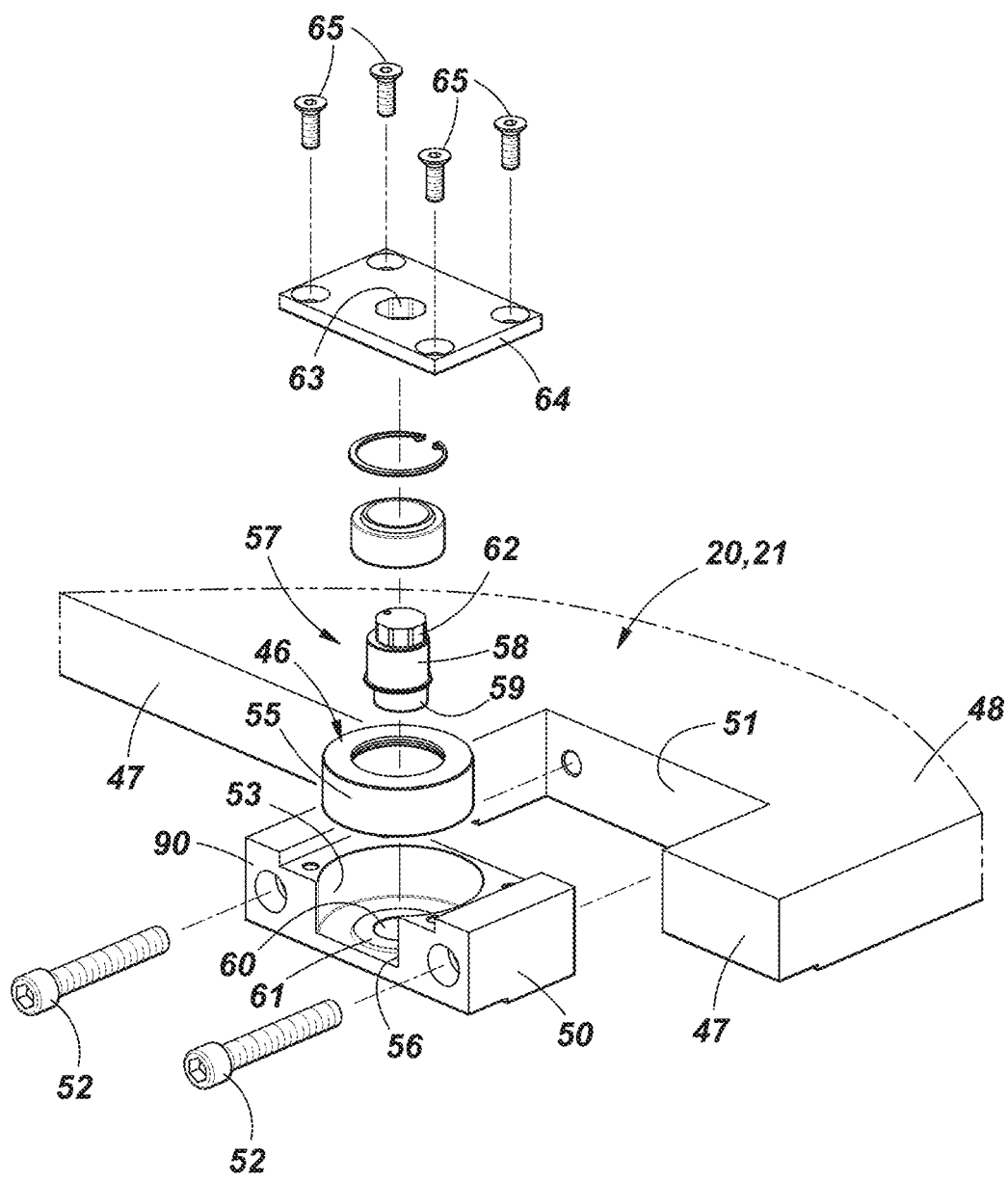
FIG. 5 is an exploded perspective view showing a rolling element adapted for installation in an edge face region of a slide blade member as shown in FIGS. 1 and 3.
Figure 6:
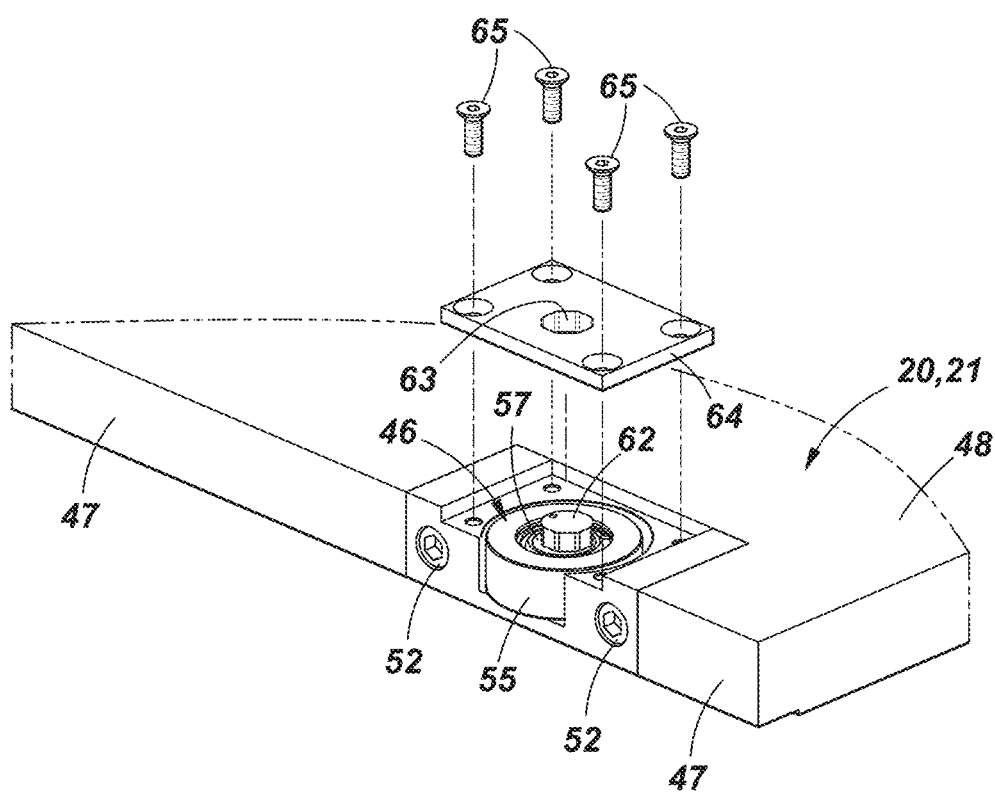
FIG. 6 is a view similar to FIG. 5 showing the rolling element partially installed.
Figure 7:
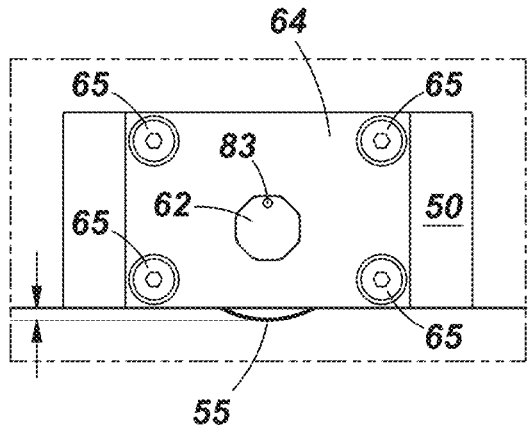
FIGS. 7 to 11 are plan views of the rolling element illustrated in FIGS. 5 and 6 installed but with differing adjustments of the roller surface extending beyond the edge face region of the slide blade member.
Figure 8:
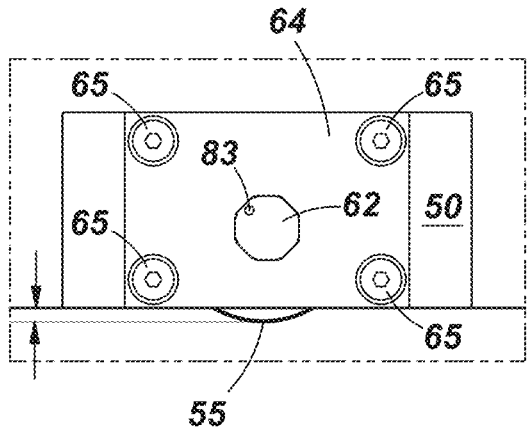
Figure 9:
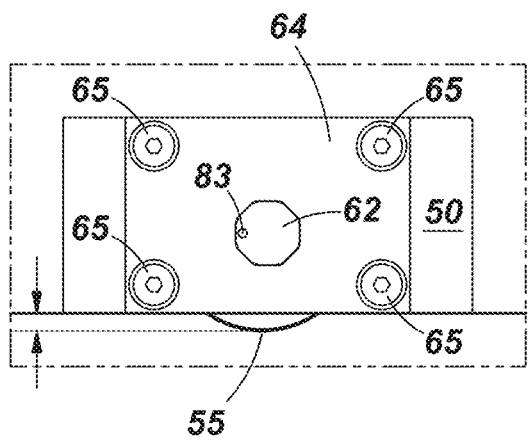
Figure 10:
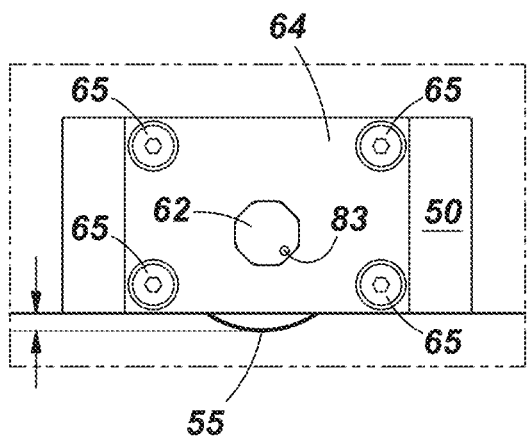
Figure 11:
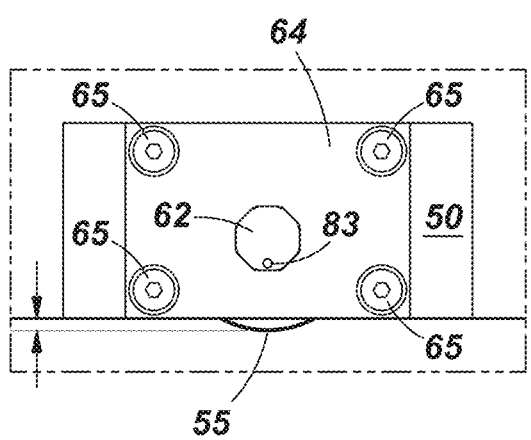
Figure 12:
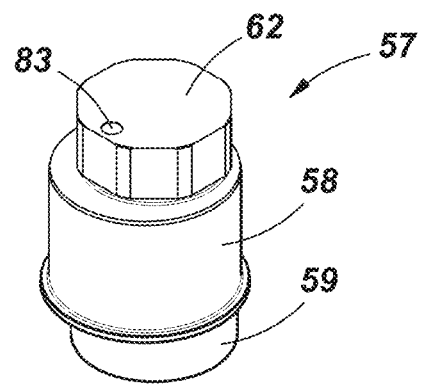
FIG. 12 is a perspective view of a mounting shaft including an eccentric portion utilised with the rolling element shown in FIGS. 5 to 11.

FIGS. 2 to 4 illustrate preferred features of one of the slide blade members 20, 21, each of which might be similarly constructed. The following refers to slide blade member 20, however, it will be understood that slide blade member 21 might be constructed in a similar manner. The slide blade member 20 has a forward confronting leading edge region 27, a rearward trailing edge region 25 and opposed side edge zones 29, 30. The slide blade member 20 has and upper face 98 and a lower face 99 extending rearwardly from said leading edge region 27. The rearward trailing edge region 25 has opposed transversely extending slide blade attachment bushes 31, 32 arranged substantially at the corner zone between the trailing edge region 25 and the respective side edge zones 29, 30. When installed, the attachment bushes 31, 32 extend through slots 80, 81 in the frame side members 16, 17 to enable same to be operationally coupled to the linear actuator members 22, via the angle alignment coupler 24. Thus operation of the linear actuator members 22 allow the slide blade member 20 to be slidingly moved within the support frame structure 11. Conveniently, in some arrangements extension side bar members 6, 7 may extend rearwardly beyond the trailing edge region 25 (see FIGS. 16, 17).

Conveniently, a releasable but attachable edge strip 33 is provided that may be connected to a body portion 35 of the slide blade member 20, the edge strip 33 providing a leading confronting edge region 27 of the slide blade member 20 (FIGS. 2 to 4). The edge strip 33 includes a flange section 34 to allow the edge strip 33, via suitable fastener elements (not illustrated), to be releasably connected to the body portion 35 of the blade member 20.

The edge strip 33 further includes forwardly extending teeth formations 36, each of which has upper and lower surfaces 37, 38 and opposed side surfaces 39, 40. Preferably the upper and lower surfaces 37, 38 are angled towards or taper towards one another. Similarly, the side surfaces 39, 40 are angled or taper towards one another whereby each teeth formation 36 has a pyramidal type shape. The teeth formations 36 provide a plurality of extended zones 95 separated by recessed zones 96. The extended zones 95 and recessed zones 96 form separated teeth formations 36.

As can be seen in FIG. 4, a similarly configured edge strip 33 on the forward edge zone 28 of the slide blade member 21, has teeth formations 36 complementary in shape to those on the edge strip 33 on slide blade member 20 whereby, in the closed configuration illustrated in FIG. 4, the respective formations 36 mesh with one another to create a sealed closure line transversely across the flow opening 12. In this configuration, the slide blade members 20, 21 together fully close the flow opening 12. The body portion 35 of the blade member 20 may be fabricated and may include a base portion 41 of mild steel or other suitable material and a hard wearing liner portion 42. Alternatively, the entire slide blade member 20 might be made from hard wearing material. The pyramidal shaped teeth formations 36 allow the flow material passing through the isolation gate valve 10 to be either pushed away or be crushed to allow a reasonably close seal between confronting surfaces of the teeth formations 36 to be achieved in the closed configuration.

While the arrangement illustrated in FIGS. 2 to 4 is preferred, other configurations for the teeth formations 36 could also be used. For example one or other of the surfaces 37, 38 might be horizontally disposed with the other surface tapering towards the generally horizontally disposed surface. Similarly, the side surfaces 39, 40 of each teeth formation 36 could also be disposed aligned with one another presenting a generally square or rectangular configuration when seen in plan view. Further, while the drawings show the teeth formations being formed on a replaceable strip member, it is possible for the teeth formations to be provided as part of the body portion 35.

FIG. 3 further illustrates pivot bores 43 adjacent the trailing edge region 25 and the side edge zones 29, 30, and adjacent the leading edge region 27 and the side edge zones 29, 30. The pivot bores 43 permit guide roller elements 44 (FIG. 14) to be mounted to the slide blade member 20 (or 21) to guide lateral movement thereof. In the illustrated preferred embodiment of FIG. 14 the roller element 44 rolls on a guide strip 45 secured to an inwardly facing surface of the frame side member 16. A similar arrangement might be provided on the inwardly facing surface of the frame side member 17. The roller element 44 includes a roller surface 100.

FIGS. 5 to 12 illustrate a possible preferred embodiment for enabling rolling movement for a slide blade member 20 and/or 21, or any alternative slide blade members utilised in an isolation gate valve as disclosed herein. As shown in these drawings a cartridge assembly including a rolling element 46 is mounted to or in a side edge zone 47 of a slide blade member 48, or in or to a side edge zone of a member attached to the slide blade member 48 such as an extension arm including side bar members 6, 7. Such arrangements allow a smaller dimension of the isolation gate valve 10 in the material flow direction through the valve 10. Still further, providing a cartridge assembly makes maintenance processes easier to carry out. The rolling element 46 includes a body part 50 securable in a recess 51 in the side edge zone 47 of the slide blade member 48 (FIGS. 7, 8, 9) or in an extension arm secured to the edge zone 47 of the slide blade member 48. Threaded screw or bolt members 52 may be used to releasably secure the member 46 in the recess 51. The body part 50 includes a central recessed region 53 sized to accommodate a rolling element 54 having an outer roller surface 55 projectable, in part, through an opening 56 in an outward facing side wall 90 of the body part 50. The rolling element is carried on a central section 58 of a shaft member or axle 57. A lower end section 59 of the shaft member 57 is journaled in a bore 60 in a lower wall 61 of the central recessed region 53 of the body part 50. An upper end section 62 of the shaft member 57 is receivable in a bore 63 in an upper closure plate 64 adapted to close the upper face of the recessed region 53. The closure plate 64 is releasably held to the body part 50 by threaded fasteners 65. The central section 58 of the shaft member 57 is eccentrically positioned or offset relative to the lower and upper end sections 59, 62. One, at least, of the end sections 59, 62 has a non-circular cross-sectional shape that fits into a complementary cross-sectional shaped bore 63 and/or 60. For example, the cross-sectional shape might be hexagonal or octagonal, but other configurations may be possible. The other end section may be circular in cross-section. Relative rotation of the shaft end section 59, 62 in its mounting bore results in rotation of the shaft member 57 with the consequent effect that the eccentric central portion 58 of the shaft member 57 causes a variable degree of extension of the roller surface 55 away from or closer to the side edge zone 47 of the slide blade member 48 or other related member. In this manner adjustment of the position of the roller surface 55 of the rolling element 54 is possible. In this manner, the central section 58 provides an eccentric shaft portion 58 of a mounting shaft portion 58 of the mounting shaft 57.

Figure 13:
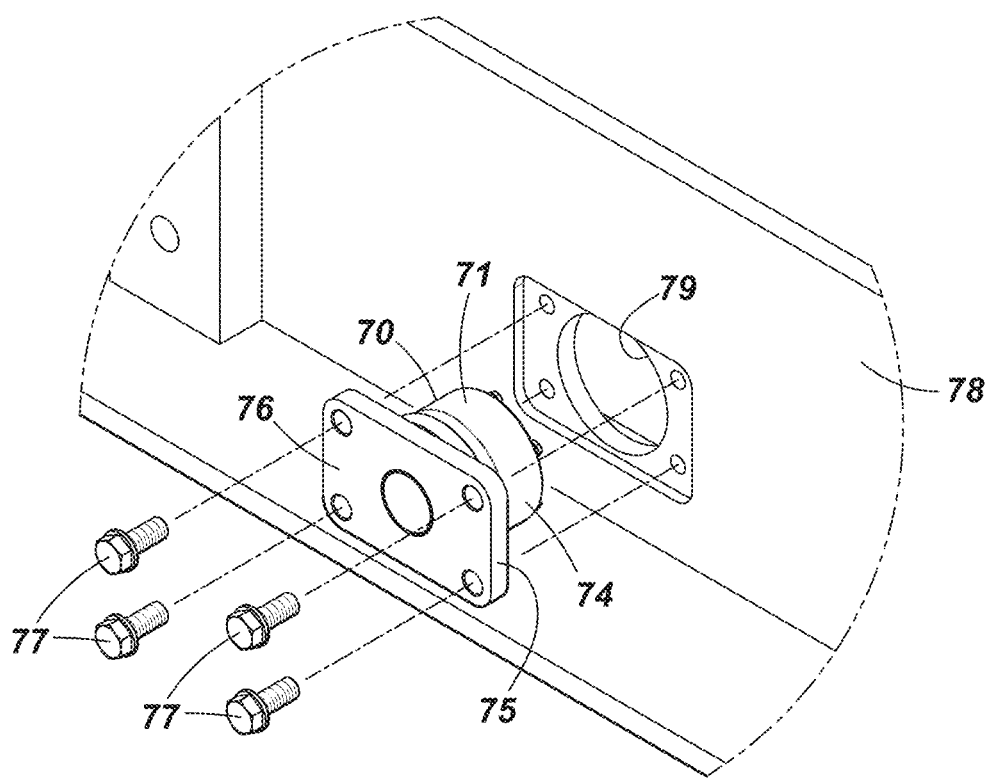
FIG. 13 is a partial perspective view of a rolling element cartridge adapted to be installed in the support frame structure of the isolation gate valve to support an edge region of a slide blade member.
Figure 14:
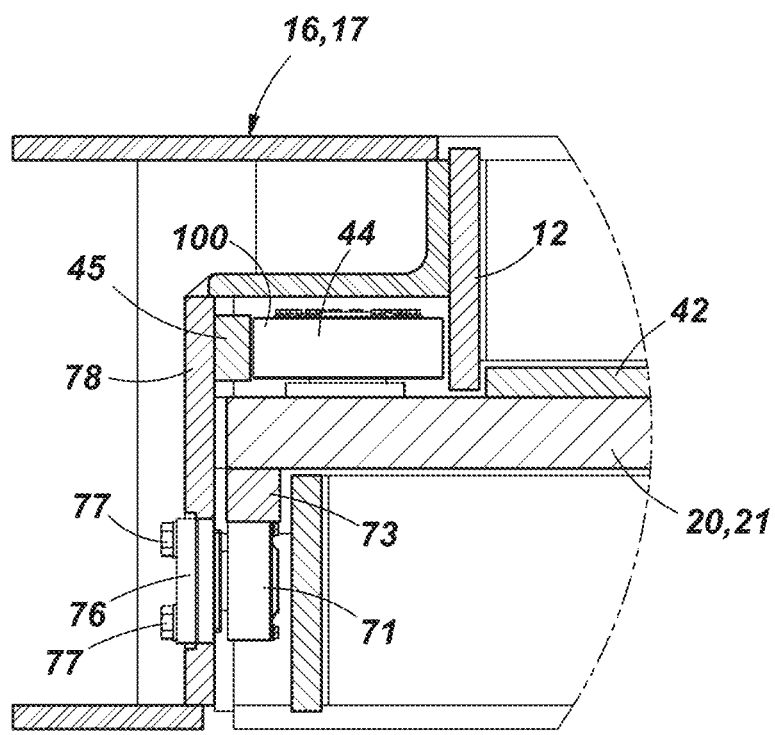
FIG. 14 is a partial cross-sectional view illustrating one preferred embodiment of the rolling element cartridge shown in in FIG. 13 in an installed position.

FIGS. 7 to 11 illustrate the effect of rotating the shaft end section 62 to selectably different positions in the location and fixing bore 63 in plate 64. The shaft end section 62 may include a physically observable marker 83 so that an operator can know which position is utilised or selected. The effect is to progressively extend the roller surface 55 from the face 57 (or side edge 47) from FIG. 7 to FIG. 11. The above described mechanism to enable adjustment positioning of the roller surface 55 might be used in any of the mechanisms disclosed herein for providing rolling movement including bearing support arrangements, including those described below (FIGS. 13, 14).

The sliding blade member or members 20, 21 may generally be supported along its (or their) lateral edge zones by at least one and preferably two or more spaced rolling elements 70. Preferably, the or each rolling element 70 presents a roller surface 71 to an under or downstream surface 72 of the sliding blade member 20, 21. The under or downstream face 72 may include on an edge formation 73 (FIG. 14). Conveniently, roller surface 71 is formed outwardly facing from a sleeve 74 in the form of a rotatable bearing ring 74. Preferably, the bearing ring 74 is constructed to permit limited swivelling or angular reconfiguration to adjust, when needed, to flexing of the sliding blade member or members 20, 21. FIGS. 13 and 14 disclose a cartridge assembly 75 for supporting the sliding blade member 20, 21, when installed. Each rolling element 70 forms part of the cartridge assembly 75 which also includes an outer mounting plate structure 76 in the form of an outer mounting plate 76 that is securable bodily by threaded fasteners 77 to a wall region 78 of the isolation gate valve, such as, for example, the frame side members 16, 17 of the support frame structure 11. Preferably, the bearing ring 74 carried by the cartridge assembly 75 can be installed bodily through an opening 79 in the wall region 78 as a single unit and can be withdrawn in a similar manner from a freely accessible outer position when replacement is needed during a maintenance process. The opening 79 provides an aperture 79.

Figure 15:
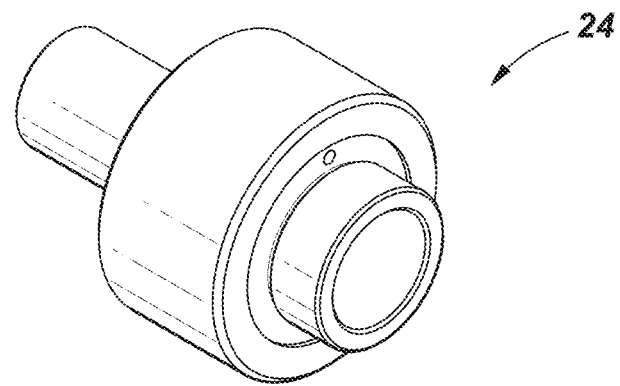
FIG. 15 is a perspective view of an angle alignment coupler utilised with the actuators illustrated in the isolation gate valve of FIG. 1.
Figure 16:
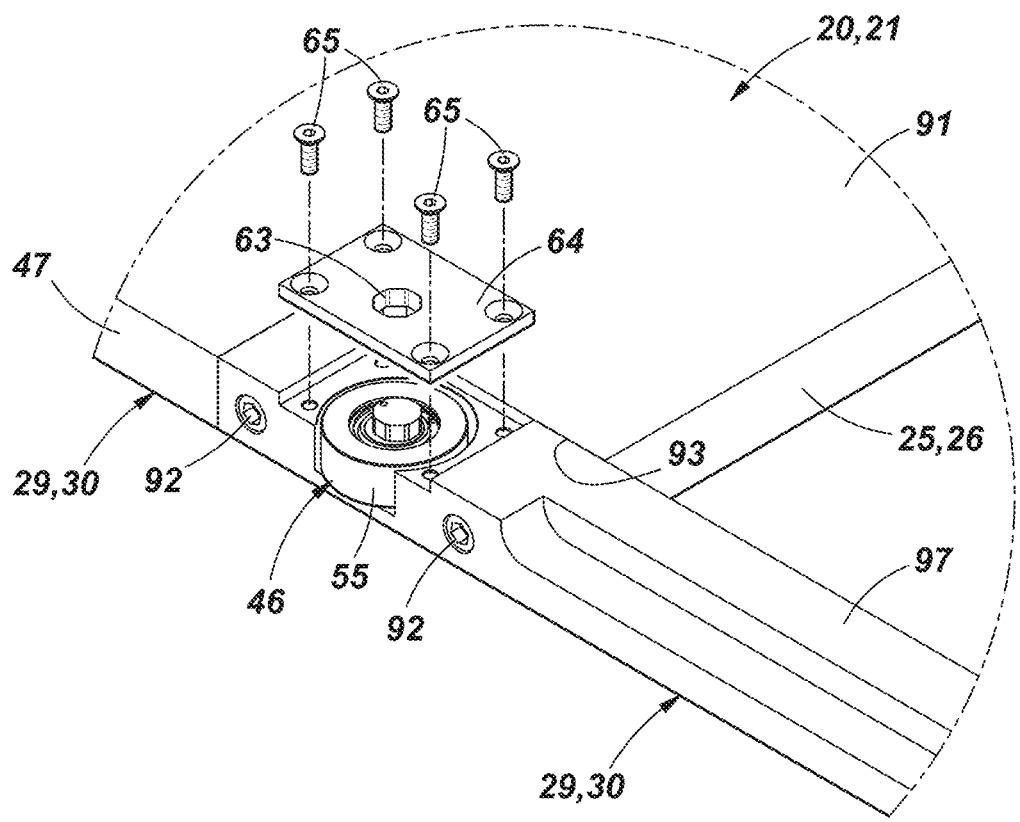
FIGS. 16 and 17 are partial perspective views of a possible variation to the slide blade member including rearwardly extending side bar members and a possible mounting of a rolling element thereto.
Figure 17:
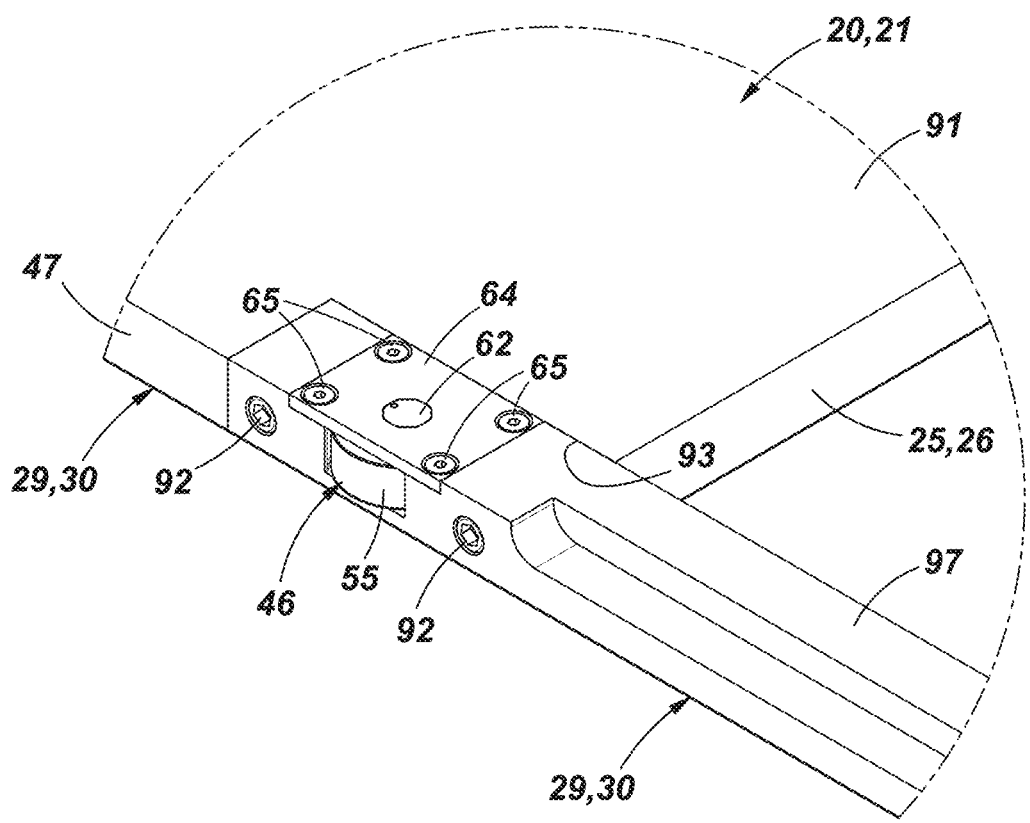

Referring to FIG. 15, an angle alignment coupler 24 is illustrated in perspective capable of use with linear actuator members 22, 23 as illustrated in FIG. 1. The alignment coupler is commercially available for use in similar applications and further description of same is unnecessary here. FIGS. 16 and 17 illustrate a possible alternative arrangement wherein side extension bar members 97 are connected to a body portion 91 of a slide blade member 20 or 21. In this case the side extension bar members 97 are secured by threaded fasteners 92 in a recess 93 in a trailing corner region of the body portion 91. The side extension bar members 97 are positioned on opposed sides of the body portion 91 and effectively extend rearwardly the side edge zones 29, 30 of the body portion 91. A rolling element 44 or 46 as described with reference to earlier drawings may be mounted to the side extension bar member 97 in the position illustrated in FIGS. 16, 17 or at spaced locations along the side extension bar members 97. The construction of the rolling element 46 illustrated may be similar to the earlier described embodiments and like reference numbers have been used for similar features.

It will be apparent to those skilled in this art that the above discussed arrangements for selectably positioning the lateral location of the peripheral roller surface 55 might also be used in the arrangement of the rolling element 70 to selectably vary the position of the peripheral roller surface 71. Still further, it is anticipated that features, aspects, or combinations of features or aspects as disclosed herein in a particular application, can be used separately or together in other applications within the scope of any one of the accompanying claims.

The claims defining the invention are as follows:

1. An isolation gate valve having a support frame structure defining a material flow opening, at least one blade member movably mounted relative to the material flow opening in said support frame structure, the or each said at least one movably mounted blade member being supported on a lower face thereof by multiple spaced apart rolling elements, at least one of said rolling elements being formed as a roller cartridge assembly having an outer mounting plate structure releasably connected to said support frame structure and a roller sleeve rotatably mounted to said outer mounting plate structure, the roller cartridge assembly extending inwardly through an aperture in a wall region of the support frame structure, the aperture being sized sufficiently to allow the roller cartridge assembly including the roller sleeve to be bodily removed from the support frame structure.

2. An isolation gate valve according to claim 1 wherein all said rolling elements are constructed as a selectably removable said roller cartridge assembly.

3. An isolation valve according to claim 1 whereby in a first position of one of said at least one movably mounted blade member, said material flow opening is configured to allow material flow therethrough, and in a second position of said one of said at least one movably mounted blade member said material flow opening is configured to prevent or inhibit material flow therethrough between said second position and said first position, said one of said at least one movably mounted blade member having a leading edge region adapted, in use, to transversely extend across said material flow opening, said one of said at least one movably mounted blade member further having opposed upper and lower faces extending rearwardly from said leading edge region and opposed first and second side edge zones extending rearwardly from said leading edge region.

4. An isolation gate valve according to claim 2 including an actuator wherein said actuator includes a first actuator member and a second actuator member, said first actuator member being operationally connected to said support frame structure on one side of said material flow opening and to the first side edge zone of said one of said at least one movably mounted blade member, said second actuator member being operationally connected to said support frame structure on a second side of said material flow opening opposite to said one side thereof and to the second side edge zone of said one of said at least one movably mounted blade member.

5. An isolation gate valve according to claim 4 wherein each of said first actuator member and said second actuator member is operationally connected to said one of said at least one movably mounted blade member rearwardly distant from said leading edge region.

6. An isolation gate valve according to claim 4 wherein each of said first actuator member and said second actuator member includes an angle alignment coupler.

7. An isolation gate valve according to claim 3 wherein the rolling element of the or each said roller cartridge assembly has a roller surface positioned, in use, in rolling contact with the lower face of the corresponding said at least one movably mounted blade member, said rolling element being carried on an eccentric shaft portion of a mounting shaft portion of a mounting shaft positional selectively relative to the roller cartridge assembly whereby said roller surface position relative to the lower face of the corresponding said at least one movably mounted blade member is selectively adjustable by selective rotation of said mounting shaft.

8. An isolation gate valve according to claim 3 wherein the or each said at least one slide blade member includes at least one said rolling element having a said roller surface extending partially laterally from a said side edge zone of the slide blade member, the or each said rolling element being mounted on an eccentric shaft portion of a mounting shaft carried by the slide blade member, whereby selective rotation of the mounting shaft results in adjustment of an extent of lateral extension of the roller surface relative to said side edge zone of the slide blade member.

9. An isolation gate valve according to claim 3 wherein the leading edge region of said one of said at least one movably mounted blade member has a plurality of extended zones separated by recessed zones to form separated teeth formations, said leading edge region being adapted to mesh with a complementary configured region of a another one of said at least one movably mounted blade members when said at least one movably mounted blade member comprises two movably mounted blade members.

10. An isolation gate valve according to claim 9 wherein said leading edge region of the or each said at least one movably mounted blade member is formed as a separable edge strip connectable to or removable from a first body section of the corresponding movably mounted blade member.

11. An isolation gate valve according to claim 3 wherein said leading edge region of said one of said at least one the movably mounted blade member is adapted, in use to transversely extend across said material flow opening, said one of said at least one movably mounted blade member further having at least one said rolling element mounted to said one of said at least one movably mounted blade member adjacent to one or both said first or said second side edge zones of said one of said at least one movably mounted blade member, the or each said at least one said rolling element extending laterally beyond a most adjacent said first or said second side edge zone of said one of said at least one movably mounted blade member.

12. An isolation gate valve according to claim 11 having said one of said at least one movably mounted blade member is cooperable with a stationary second member in said second position, or said one of said at least one movably mounted blade member is cooperable with another one of said at least one mounted blade members in said second position, whereby leading edge regions of said members cooperate in said second position.

13. An isolation gate valve according to claim 12 wherein the or each said at least one movably mounted blade member includes a blade body section and a pair of blade side extension bars extending rearwardly from a trailing edge region of said blade body section, said blade side extension bars extending said first and said second side edge zones rearwardly from said trailing edge region of the blade body section, a said rolling element being mounted to one or both said blade side bars.

14. An isolation gate valve according to claim 11 wherein at least one said rolling element is mounted in one of said first or said second side edge zones of the or each said at least one movably mounted blade member.

\* \* \* \* \*